United States Patent
Driver

[11] 3,841,092
[45] Oct. 15, 1974

[54] REGENERATIVE RAM JET ENGINE
[76] Inventor: "W" "B" Driver, 19 Sheridan Rd., Arnold, Md. 21012
[22] Filed: Feb. 27, 1973
[21] Appl. No.: 336,233

[52] U.S. Cl. ................. 60/269, 60/39.52, 60/270 R
[51] Int. Cl. ............................................. F02k 7/10
[58] Field of Search ....... 60/270, 269, 39.52, 39.69, 60/39.36; 417/73, 75; 431/115, 116

[56] References Cited
UNITED STATES PATENTS
| | | | |
|---|---|---|---|
| 1,069,694 | 8/1913 | Hayot | 60/270 R |
| 2,670,597 | 3/1954 | Ville me Jane | 60/269 |
| 2,906,092 | 9/1959 | Haltenberger | 60/39.52 |
| 3,354,636 | 11/1967 | Utrup et al. | 60/39.35 |
| 3,626,694 | 12/1971 | Holste | 60/39.52 |

FOREIGN PATENTS OR APPLICATIONS
696,346    5/1930    France .............................. 431/116

Primary Examiner—C. J. Husar
Assistant Examiner—O. T. Sessions

[57] ABSTRACT

According to the invention, a regenerative ram jet engine which consists of a tube that is coiled so some of the heated gas that drives the engine can be injected into the incoming air after the incoming air has entered the intake end of the tube. The heated gas is directed into the incoming air in such a way as to preheat the incoming air before fuel is mixed with incoming air, to ignite the fuel, to act as a flame holder and to create a difference in pressure in the intake part of the tube so that air will be drawn into the tube.

1 Claim, 3 Drawing Figures

REGENERATIVE RAM JET ENGINE

BACKGROUND OF THE INVENTION

1. Field of the Invention

This invention relates to jet propulsion systems for aircraft or missiles that fly in both the subsonic and supersonic range.

2. Prior Art

Ram jet engines are one of the simplest engines made because they contain no moving parts. The present ram jet engines primarily consist of a straight tube in which air is forced into one end of the tube by moving the tube through the air at high speed. The air is heated inside the tube by the combustion of fuel and the resulting heated gas is exhausted out the exhaust end of the tube and drives the tube forward. This type of engine offers one of the best means for obtaining supersonic or hypersonic flight with air breathing engines, but present ram jet engines have two problems that make this engine almost impractical except for some missile propulsion. The problems are high fuel consumption and the requirement for the engine to move at a high rate of speed before sufficient air flow into the engine can allow proper operation.

SUMMARY OF THE INVENTION

An object of the invention is to provide an improved ram jet which vents some of the heated gas for engine propulsion, for use to preheat the incoming air after the incoming air has entered the intake end of the engine and before fuel is injected into the incoming air, so less fuel would be required to raise the temperature of the incoming air to generate the heated gas required to provide the thrust for the engine.

An object of the invention is to use the heated gas that is vented into the incoming air to ignite the fuel that is injected into the incoming air while the engine is in operation. Also the heated gas when vented into the incoming air would cause turbulence in the incoming air and cause an improved mixture of the fuel with the incoming air allowing the heated gas to be used as a flame holder.

An object of the invention is to vent the heated gas into the incoming air in such a way that a low pressure area will be created that will draw air into the intake end of the engine.

DESCRIPTION OF THE DRAWINGS

In the accompanying drawings.

DESCRIPTION OF THE PREFERRED EMBODIMENT

Figure 1:
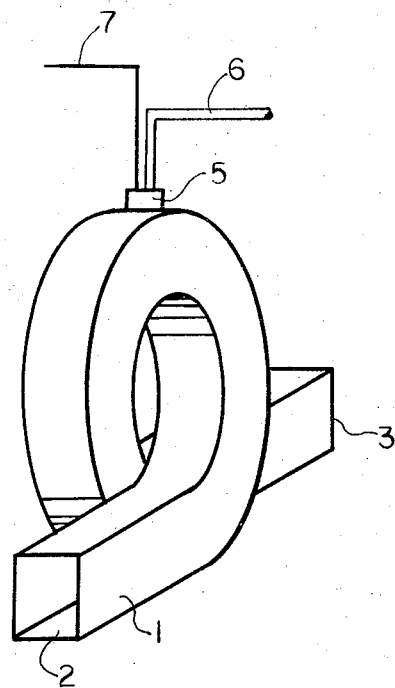
FIG. 1 is a three dimensional overall view of the engine.
Figure 2:
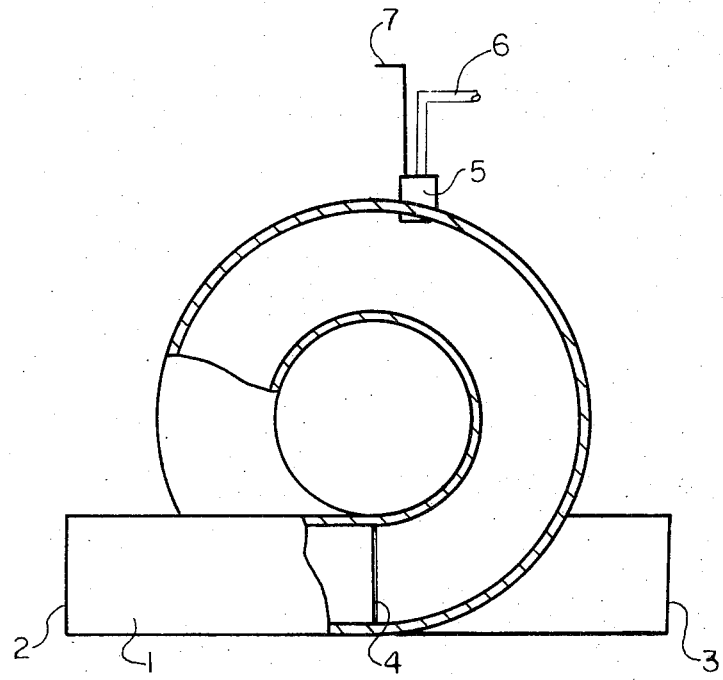
FIG. 2 is a side cross section showing the vent and part of the coiled section of the tube.
Figure 3:
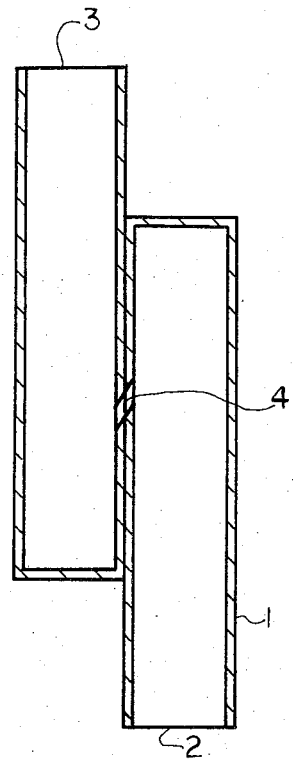
FIG. 3 is a bottom cross section of the tube showing a top view of the vent and how it is shaped.

Referring to the accompanying drawings which form a part of this disclosure, the regenerative ram jet engine consists of a tube 1 which is coiled so that one side of tube 1 will interface with its opposite side of tube 1. The two sides are attached at the interface and vent 4 is constructed where the two sides interface and vent 4 forms an opening through the two sides.

When the engine is in operation incoming air enters through the intake end 2 of tube 1 and flows past vent 4 where some heated gas, from combustion of fuel with the incoming air in the coiled section of tube 1, is vented through vent 4 into the incoming air. The heated gas preheats the incoming air before fuel is injected into the incoming air in the coiled section of tube 1. The preheating of the incoming air raises the temperature and pressure of the incoming air so less fuel will be required for combustion with the incoming air to generate the heated gas to be exhausted out the exhaust end 3 of tube 1 to provide the required thrust for engine propulsion. As the heated gas, generated by the combustion of fuel with the incoming air in the coiled section of tube 1, flows from the coiled section of tube 1 toward the exhaust end 3, some of this heated gas is vented by vent 4 into the incoming air from intake end 2 to complete the cycle. This cycle is maintained as long as the engine is operating.

Fuel is supplied to the engine by fuel line 6 which is connected to ignitor injector 5 which injects the fuel into the coiled section of tube 1. When the engine is being started ignitor injector 5 electrically ignites the injected fuel. Electrical power is supplied to ignitor injector 5 by electrical wire 7.

The heated gas that is vented through vent 4 flows in about the same direction as the incoming air, but the heated gas travels at a higher rate of speed than the incoming air. The difference in speed between the heated gas and the incoming air causes turbulence in the incoming air. This turbulence improves the mixture of the injected fuel with the incoming air, providing a more efficient combustion of the fuel. This improved mixture provides the same function as a flame holder in present ram jet engines. Since the vented heated gas flows in about the same direction as the incoming air but at a higher rate of speed there will be a drop in pressure where the heated gas and the incoming air interface at vent 4. This drop in pressure will draw air into the intake end 2 of tube 1. This is the first ram jet engine that does not completely depend on the movement of the engine through air to induce air flow into the engine, and offers an increase in both efficiency and flexibility of ram jet engines.

The vented heated gas would be used to ignite the fuel injected into the incoming air while the engine is in operation.

I claim:

1. A regenerative ram jet engine comprising a tube coiled so that one side of said tube will interface with the side opposite of said side, the two said sides attached where the two said sides interface, diagonal vent means through the two said sides where the two said sides are attached, the intake end of the said tube faces in the direction the said engine will move, the exhaust end of said tube faces in the direction opposite the direction the intake end faces, Combustion means and fuel injection means in the coiled section of said tube, incoming air flows into said tube through the intake end, fuel is injected into and burned with the incoming air in the coiled section of said tube, heated gas generated by the burning of fuel with the incoming air flows from the coiled section of said tube out the exhaust end of said tube, thrust is provided to said engine by the heated gas flowing out the exhaust end of said tube, the heated gas flowing along the inside wall of said tube where the vent is located is vented through the diagonal vent means into the incoming air before fuel is injected into the incoming air, preheating of the incoming air is accomplished by the vented heated gas before fuel is injected into the incoming air, the direction of flow of the vented heated gas approximates the flow direction of the incoming air in said tube, a low pressure zone created by the direction of flow of the vented heated gas is located in said tube between the intake end and said vent means and assists in drawing air into the intake end, ignition of the fuel injected into the incoming air is sustained by the vented heated gas after said engine has been started, a flame holding action is accomplished by the vented heated gas flowing into the incoming air, due to the said tube being coiled and the interface between the two opposite sides, most of the vented heated gas will not be revented when the vented heated gas flows from the coiled section of said tube the second time because most of the vented heated gas will flow along the inside wall of said tube opposite the inside wall of said tube where the vent is located and discharge through the exhaust end.

* * * * *